Patented Dec. 30, 1930

1,787,179

UNITED STATES PATENT OFFICE

ELMER H. STUART, OF INDIANAPOLIS, INDIANA, ASSIGNOR TO ELI LILLY AND COMPANY, OF INDIANAPOLIS, INDIANA, A CORPORATION OF INDIANA

LENS EXTRACT AND PROCESS OF MAKING IT

No Drawing.   Application filed October 11, 1926. Serial No. 141,035.

It is the object of my invention to produce a more effective lens extract and process of making it.

Considerable work has been done by several investigators on the preparation of a lens extract for use in the treatment and arrest of cataracts. Such lens extract is administered parenterally, usually hypodermically. This previous work is reported in some detail in an article by Dr. A. Edward Davis, published in the transactions of the American Ophthalmological Society, vol. 22, pp. 112–126.

In all former lens extracts of which I am aware, the potency has been quite low, the extract has contained so much impurities that its use frequently resulted in shock and in inflammation and induration at the site of injection, the extract has been turbid, and the concentration has been such that comparatively large injections had to be given and considerable inconvenience was thereby caused.

By my invention, I get a potent lens extract, that is more effective and more safely and conveniently usable. I get a much greater concentration than has heretofore been possible, so that a smaller dose may be used. The extract is relatively free from deleterious substances, so that when given hypodermically it substantially never either produces shock or causes inflammation or induration at the site of injection. My solution is clear, because it contains very little solid matter. On boiling it remains clear and retains its potency. Further, the nitrogen-content of my extract is much lower for the amount required to produce a given therapeutic effect than is the case with any previous extract of which I am aware; which is probably the largest factor in the production of the other advantages noted above. Because of these things, my extract is sufficiently free from injurious substances for repeated administration.

In carrying out my invention, I use the eyes of animals, conveniently those of hogs or cattle. I carefully remove the lenses from the eyes, extract them with alcohol, and convert the alcohol solution into a water solution, as by driving off the alcohol with or without the addition of water. Thus the final product is only what is soluble both in fairly concentrated alcohol and in water.

In doing this, I desirably make several extractions of the lenses with alcohol; desirably making some of the extractions from the whole lenses and later ones after grinding the lenses through a meat grinder, and desirably making the earlier extractions cold and at least one with the alcohol heated to boiling. I mix the various extracts together, and then evaporate, preferably under vacuum, this mixture of the extracts to reduce the volume, desirably to a point where the solution begins to foam, add an amount of distilled water equal to about one-third of the original total extracting alcohol used, and continue the evaporation until the total volume has been reduced to about the volume of the added distilled water, thus getting rid of practically all the alcohol. The resultant material is desirably defatted, as by being extracted with gasoline or other suitable solvent several times; filtered; and further evaporated, desirably under vacuum, to remove the gasoline and to reduce the volume to about one-sixth of the total volume of the original extracting alcohol. The material now remaining is suitably filtered, as through a talc pad, to obtain a clear liquid. A preservative may be added, if desired or necessary.

The final solution thus obtained is the potent and purified lens extract embodying my invention.

This purified lens extract contains less than 2½% total solids, and usually of the order of 1.5% to 2.0% total solids. It contains less than 0.25% residual nitrogen, and usually of the order of 0.1% to 0.125% residual nitrogen. It represents much more than 1 gram, and usually about 2 grams, of lenses per c. c., which is many times more than in any previous lens extract of which I am aware, being twenty times more than in the next most potent that I know of. It is sufficiently concentrated so that it may be injected in relatively small amounts and yet be effective. It substantially never produces shock or causes inflammation or induration at the site of injection. My solution is clear, while other solutions of which I am aware are turbid, so that with my solution there is less danger of mechanical interference from suspended solids as well as less danger of shock or of protein sensitization. Further, even on boiling, it remains clear and retains its potency; and no previous extract has done this, so far as I am aware.

One example of a specific preparation of a lens extract in accordance with my invention is as follows:

The lenses are removed from about 300 pounds of hog eyes, which gives a weight of lenses of about 11.25 pounds. To these lenses is added 5000 c. c. of alcohol, desirably ethyl alcohol—which may be suitably denatured. This is thoroughly stirred for some minutes, and allowed to stand in the refrigerator for several hours, desirably over night. Then the lenses are strained off, but the supernatant liquid is preserved. The lenses are then ground through a meat grinder, and are again extracted with 5000 c. c. of alcohol, stirred, allowed to stand overnight, and the lenses again strained off and the supernatant liquid preserved. The two extractions just described are desirably cold extractions, at about ordinary room temperature. A third extraction then is made of the lenses with another 5000 c. c. of alcohol, but during this extraction the mixture of alcohol and lenses is heated on a water bath to boiling, and then allowed to cool for several hours, until substantially room temperature is reached. Then the lenses are strained off for the third time, and the supernatant liquid again preserved. The liquids remaining from the three extractions are then mixed together, and filtered to remove any suspended solids.

The mixture of the three extracts is evaporated under vacuum until the solution begins to foam. Then 4500 c. c. of distilled water is added, and the evaporation under vacuum is continued until the total volume has been reduced to between 4500 and 5000 c. c.

This liquid is now extracted with gasoline, conveniently about three times, using about one-third of a gallon of gasoline per extraction. The gasoline serves to remove any fats which may be present. After the final gasoline extraction, the material is filtered, and returned to the vacuum still for further evaporation under vacuum, to remove any remaining gasoline and to reduce the volume to about 2500 c. c. This liquid is cooled to about 3° C. for several hours, conveniently over night; and then filtered, as through a talc pad, to remove any solids which may possibly remain in suspension. Each c. c. of this final solution represents about two grams of lenses.

This final solution is the lens extract embodying my invention. It may be filled into vials or ampoules of convenient size, and may be kept without material loss of potency for at least several months. It has been kept for over six months without appreciable loss of potency.

This final extract has been used with marked success in treating and arresting cataracts.

I claim as my invention:—

1. The process of preparing a lens extract, which consists in extracting with alcohol lenses of the eyes of animals, repeating the extraction several times with separate quantities of alcohol, mixing the several extracts together, evaporating the combined extracts and adding water before the completion of the evaporation, defatting with a suitable hydrocarbon, evaporating further, and separating and preserving the clear liquid.

2. The process of preparing a lens extract, which consists in extracting with alcohol lenses of the eyes of animals, evaporating the extract and adding water before the completion of the evaporation, defatting with a suitable hydrocarbon, evaporating further, and separating and preserving the clear liquid.

3. The process of preparing a lens extract, which consists in extracting with alcohol lenses of the eyes of animals, repeating the extraction several times with separate quantities of alcohol, mixing the several extracts together, evaporating the combined extracts, defatting with a suitable hydrocarbon, evaporating further, and separating and preserving the clear liquid.

4. The process of preparing a lens extract, which consists in extracting with alcohol lenses of the eyes of animals, evaporating the extract, defatting with a suitable hydrocarbon, evaporating further, and separating and preserving the clear liquid.

5. The process of preparing a lens extract, which consists in extracting with alcohol lenses of the eyes of animals, evaporating the extract, defatting with a suitable hydrocarbon several times, evaporating further, and separating and preserving the clear liquid.

6. The process of preparing a lens extract, which consists in extracting with alcohol lenses of the eyes of animals, repeating the extraction several times with separate quantities of alcohol, mixing the several extracts together, evaporating the combined extracts and adding water to convert the alcohol solution into a water solution, and separating and preserving the clear liquid.

7. The process of preparing a lens extract, which consists in extracting with alcohol lenses of the eyes of animals, evaporating the extract and adding water to convert the alcohol solution into a water solution, and separating and preserving the clear liquid.

8. The process of preparing a lens extract, which consists in extracting with alcohol lenses of the eyes of animals, repeating the extraction several times with separate quantities of alcohol, mixing the several extracts together, evaporating the combined extracts to convert the alcohol solution into a water solution, and separating and preserving the clear liquid.

9. The process of preparing a lens extract, which consists in extracting with alcohol lenses of the eyes of animals, evaporating the extract to convert the alcohol solution into a water solution, and separating and preserving the clear liquid.

10. The process of preparing a lens extract, which consists in extracting with alcohol lenses of the eyes of animals, repeating the extraction several times with separate quantities of alcohol, grinding the lenses as an intermediate step between two of the alcohol extractions, mixing the several extracts together, evaporating the combined extracts to convert the alcohol solution into a water solution, and separating and preserving the clear liquid.

11. The process of preparing a lens extract, which consists in extracting with alcohol lenses of the eyes of animals, repeating the extraction several times with separate quantities of alcohol at different temperatures, mixing the several extracts together, evaporating the combined extracts to convert the alcohol solution into a water solution, and separating and preserving the clear liquid.

12. The process of preparing a lens extract, which consists in extracting with alcohol lenses of the eyes of animals, repeating the extraction several times with separate quantities of alcohol, the first extraction being cold and a later one being with the alcohol boiling, mixing the several extracts together, evaporating the combined extracts to convert the alcohol solution into a water solution, and separating and preserving the clear liquid.

13. A lens extract, comprising a potent extract made from lenses of the eyes of animals and effective for treating and arresting cataracts, said lens extract containing less than 2.5% total solids.

14. A lens extract, comprising a potent extract made from lenses of the eyes of animals and effective for treating and arresting cataracts, said lens extract containing total solids of the order of 1.5% to 2.0%.

15. A lens extract, comprising a potent extract made from lenses of the eyes of animals and effective for treating and arresting cataracts, said lens extract containing less than 0.25% residual nitrogen.

16. A lens extract, comprising a potent extract made from lenses of the eyes of animals and effective for treating and arresting cataracts, said lens extract containing residual nitrogen of the order of 0.1% to 0.125%.

In witness whereof, I have hereunto set my hand at Indianapolis, Indiana, this 8th day of October, A. D. one thousand nine hundred and twenty six.

ELMER H. STUART.